United States Patent Office 3,372,175
Patented Mar. 5, 1968

3,372,175
19-NOR-14β,17α-PREGNANE DERIVATIVES AND PROCESS
John H. Fried, Palo Alto, Calif., assignor to Syntex Corporation, Panama, Panama, a corporation of Panama
No Drawing. Filed Nov. 1, 1965, Ser. No. 505,995
6 Claims. (Cl. 260—397.4)

ABSTRACT OF THE DISCLOSURE

17β - hydroxy - 19 - nor - 14β,17α - pregn - 4 - ene-3,20-dione, 3β,17β - dihydroxy - 19 - nor - 14β,17α-pregn-4-ene-20-one, and the 3- and/or 17β-esters thereof, which are optionally substituted at the C–6 position with a chloro or fluoro group and/or at the C–18 position with a methyl group, and/or which are optionally unsaturated between the C–6 and C–7 position, are progestational agents and fertility control agents.

---

The present invention relates to cyclopentanopolyhydrophenanthrene derivatives. Specifically it pertains to 19-nor-14β,17α-pregnenes of the formula:

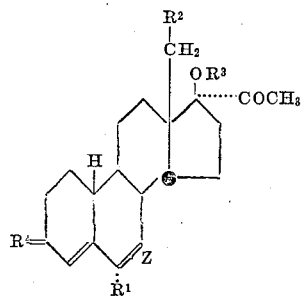

wherein Z is carbon-carbon single bond or a carbon-carbon double bond;

$R^1$ is hydrogen, chloro or fluoro;
$R^2$ is hydrogen or methyl;
$R^3$ is hydrogen or a hydrocarbon carboxylic acyl group of less than 12 carbon atoms; and
$R^4$ is an oxygen atom or the group

$$R^5O-$$

in which $R^5$ is hydrogen, tetrahydropyranyl or a hydrocarbon carboxylic acyl group of less than 12 carbon atoms.

The hydrocarbon carboxylic acyl group of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The compounds represented by the foregoing formula demonstrate progestational activity and are useful in the treatment of conditions usually responsive to known progestational agents, such as various menstrual disorders. In addition these compounds find value in the control of fertility.

The 19-nor-14β,17α-pregnanes and 18-methyl-18-nor-14β,17α-pregnanes of the present invention are prepared from a 3-methoxy-17α-acetoxy-17β-ethynyl-14β-estra-1,3,5(10)-triene, or the corresponding 18-methyl compound, the synthesis of which is the subject matter in part of copending application Ser. No. 505,191, filed Oct. 25, 1965. Upon treatment of such compounds with mercuric sulfate and sulfuric acid, there is formed a 3-methoxy-17α-acetoxy-14β-pregna-1,3,5(10)-trien-20-one, or the corresponding 18-methyl-14β-pregnatriene. These compounds are then reduced with lithium or sodium in liquid ammonia under the usual Birch reduction conditions, thereby forming a 3-methoxy-19-nor-20-hydroxy-14β,17α-pregna-2,5(10)-diene. This compound, or its 18-methyl counterpart, is then hydrolytically rearranged as with methanolic hydrochloric acid to generate the 3-keto-Δ⁴-ene system, the 20-keto group then being regenerated as through the use of chromic acid. Introduction of the 17β-hydroxy group is accomplished through initial formation of the 3-enol ether as through the use of ethyl orthoformate in the presence of an acid such as p-toluene-sulfonic acid. Treatment of this enol ether with oxygen in the presence of potassium t-butoxide then generates the corresponding 17β-hydroperoxide which is reduced with zinc and acetic acid to yield the 17β-hydroxy-19-nor-14β,17α-pregn-4-ene-3,20-dione, or the corresponding 18-methyl derivative. These transformations may be represented as follows

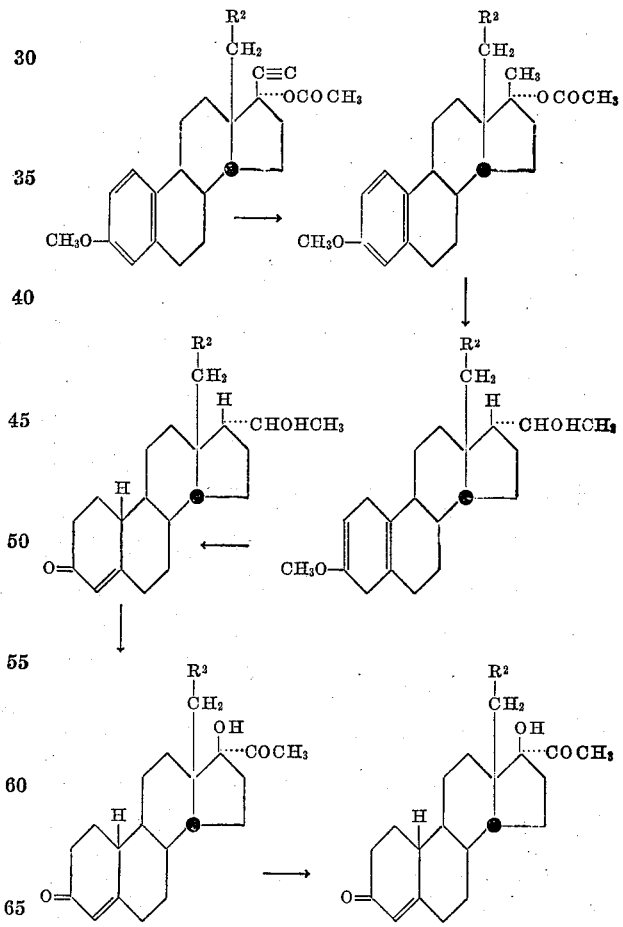

The 17β-hydroxy derivatives of the present invention may be treated with an appropriate acylating agent such as acetic anhydride, pentanoic anhydride, hexanoic anhydride or the like in the presence of a strong acid to yield the corresponding 17β-acylate.

Introduction of a 6-chloro or 6-fluoro substituents is accomplished via formation of the 3-enol ether, as with ethyl orthoformate, and treatment of this with N-chlorosuccinimide or perchloryl fluoride, respectively.

A $\Delta^6$-double bond is introduced through formation of the 3-enol ether and treatment of this enol ether with 2,3-dichloro-5,6-dicyanobenzoquinone.

Selective reduction of the 3,20-diketo-14β-pregn-4-ene of the present invention with sodium borohydride yields the corresponding 3β-hydroxy compound which may be converted to its 3β-tetrahydropyranyl ether with dihydropyran and p-toluenesulfonic acid, or to its 3β-acylate with the appropriate acid anhydride in pyridine.

The following examples will serve to further typify the nature of the present invention but should not be construed as a limitation thereof.

EXAMPLE 1

A mixture of 8 g. of 3-methoxy-18-methylestra-1,3,5-(10)-trien-17-one, 10 ml. of ethyl orthoformate, 5 ml. of ethylene glycol and 300 mg. of p-toluenesulfonic acid is refluxed under nitrogen for two hours and then poured into methylene chloride. The orgainc solution is washed with aqueous sodium bicarbonate solution, dried, treated with 0.5 ml. of pyridine and concentrated in vacuo. The resultant oil is triturated with petroleum ether and allowed to solidify to yield 3-methoxy-17,17-ethylenedioxy-18-methylestra-1,3,5(10)-triene. To a solution of this material (5.66 g.) in 250 ml. of tetrahydrofuran are added 1 equivalent (5.45 g.) of pyridine hydrobromide perbromide. After stirring for 2½ hours at room temperature, 50 ml. of aqueous sodium bicarbonate solution and 500 ml. of water are added. The solution is extracted with methylene chloride and these extracts are then dried over sodium sulfate and evaporated to yield the 16-bromo intermediate. This compound is dissolved in dry xylene and refluxed under nitrogen for 22 hours with 7.5 g. of potassium t-butoxide (obtained by adding 2.62 g. of potassium metal to t-butanol). The mixture is poured into water and extracted with methylene chloride. These extracts are washed with water, dried over sodium sulfate, and evaporated to dryness. The residue is combined with 130 ml. of methanol and 7.2 ml. of 2 N hydrochloric acid and this mixture is refluxed under nitrogen for 5 hours. The solution is then diluted with methylene chloride, washed with dilute aqueous sodium bicarbonate solution, dried over sodium sulfate and evaporated in vacuo. The residue is dissolved in petroleum ether containing a little benzene and chromatographed on silica, eluting with 1:9 ethyl ether:petroleum ether to yield 3-methoxy-18-methylestra - 1,3,5(10),14 - tetraen-17-one (which may contain varying amounts of the tautomeric 3-methoxy-18-methylestra - 1,3,5(10),15-tetraen-17-one). This material is dissolved in 25 ml. of ethyl acetate and hydrogenated in the presence of 7 g. of pre-reduced 10% palladium-on-charcoal in 475 ml. of ethyl acetate, at room temperature and atmospheric pressure. The hydrogenation is continued until the theoretical amount of hydrogen is absorbed and the catalyst is then removed by filtration, washing the solid well with methylene chloride. The combined washings and filtrates are then evaporated to yield 3-methoxy-18-methyl-14β-estra-1,3,5(10)-trien-17-one which may be further purified through recrystallization from acetone:petroleum ether.

In a similar fashion from 3-methoxyestra-1,3,5(10)-trien-17-one, there is obtained 3-methoxy-14β-estra-1,3,5-(10)-trien-17-one.

Alternatively, these compounds may be obtained through treatment of the 17-keto starting material with isopropenyl acetate and p-toluenesulfonic acid to yield the $\Delta^{16}$-ene-17-acetate. Upon treatment of this enol acetate with chlorine or bromine, the corresponding 16-chloro-17-keto or 16-bromo-17-keto compound is obtained. Upon prolonged refluxing of a mixture of either of these compounds, ethylene glycol and p-toluenesulfonic acid, in toluene, the 16-chloro- or 16-bromo-17,17-ethylenedioxy intermediate is obtained which may be dehydrohalogenated and hydrogenated as previously described.

A stream of dry, acetone-free acetylene is introduced under nitrogen into a cooled mixture of dry tetrahydrofuran and 88 ml. of a 15.1% solution of n-butyl lithium in hexane. One gram of 3-methoxy-18-methyl-14β-estra-1,3,5(10)-trien-17-one, dissolved in a small amount of tetrahydrofuran is then added. After the mixture has stood at room temperature for 24 hours, one half the above quantity of lithium acetylide, prepared in the same fashion is added. This mixture is allowed to stand at room temperature for a further 24 hours and is then cautiously poured into a stirred ice-water mixture. This is then extracted with methylene chloride and these extracts in turn are washed with water, dried and evaporated to dryness. The residue is then chromatographed on silica using 5% isopropyl alcohol in chloroform to yield 3-methoxy-17β-ethynyl-18-methyl-14β-estra-1,3,5(10)-trien-17α-ol.

By employing 3-methoxy-14β-estra-1,3,5(10)-trien-17-one in this procedure, there is obtained 3-methoxy-17β-ethynyl-14β-estra-1,3,5(10)-trien-17α-ol.

Two grams of 3-methoxy-17β-ethynyl-18-methyl-14β-estra-1,3,5(10)-trien-17α-ol is added to 20 ml. of acetic anhydride and p-toluenesulfonic acid. The mixture is allowed to stand at room temperature for one hour and then poured into water. Upon extraction with methylene chloride and drying and evaporation of these extracts, there is obtained 3-methoxy-17α-acetoxy-17β-ethynyl-18-methyl-14β-estra-1,3,5(10)-triene which may be further purified through chromatography on silica, eluting with benzene and methylene chloride.

Similarly from 3-methoxy-17β-ethynyl-14β-estra-1,3,5-(10)-trien-17α-ol, there is obtained according to the foregoing procedure, 3-methoxy-17α-acetoxy-17β-ethynyl-14β-estra-1,3,5(10)-triene.

EXAMPLE 2

A mixture of 1 g. of 3-methoxy-17α-acetoxy-17β-ethynyl-18-methyl-14β-estra-1,3,5,(10)-triene, 150 ml. of ethanol, 25 ml. of 20% sulfuric acid and 0.885 g. of mercuric sulfate is refluxed under nitrogen for 90 minutes. The mixture is then cooled, neutralized with sodium bicarbonate, concentrated in vacuo and diluted with water. This mixture is then extracted with ethyl acetate and these extracts are washed with water and evaporated in vacuo to yield 3-methoxy-19-nor-17-acetoxy-18-methyl-19-nor-14β-pregna-1,3,5(10)-trien-20-one, which may be used in the following procedure without further purification.

To a stirred suspension of 1.139 of 3-methoxy-17α-acetoxy-18-methyl-19-nor-14β-pregna-1,3,5(10) - trien-20-one, 30 ml. of t-butanol, 30 ml. of tetrahydrofuran and 150 ml. of liquid ammonia is added sodium metal until a blue color persists. The reaction is stirred for 7 hours, adding sodium as necessary to maintain the blue color. At the end of this time, the color is discharged by the addition of methanol and the ammonia is allowed to escape through evaporation. After the careful addition of water, the reaction mixture is extracted under nitrogen with methylene chloride. These extracts are washed was water, dried and evaporated to dryness. The residue is refluxed under nitrogen for one hour with 90 ml. of ethanol, 9 ml. of water and 1 ml. of concentrated hydrochloric acid. At the end of this time the mixture is poured into aqueous sodium bicarbonate and extracted with methylene chloride. These extracts are washed with water, dried over sodium sulfate and evaporated to dryness to yield 18-methyl-19-nor-20-hydroxy-14β,17α-pregn-4-en-3-one which may be used in the next step without separation or further purification.

To a stirred solution of 1 g. of 18-methyl-19-nor-20-hydroxy-14β,17α-pregn-4-en-3-one in 10 ml. of acetone, cooled to 0° C., is added, under nitrogen, a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed and dried under vacuum to yield 18-methyl-19-nor-14β,17α-pregn-4-ene-3,20-dione which may be further purified by recrystallization from acetone:hexane.

In a similar fashion from 3-methoxy-17α-acetoxy-17β-ethynyl-14β-estra-1,3,5(10)-triene there is obtained by following the procedure of this example, 19-nor-14β,17α-pregn-4-ene-3,20-dione.

EXAMPLE 3

A mixture of 1 g. of 18-methyl-19-nor-14β,17α-pregn-4-ene-3,20-dione, 1 ml. of ethyl orthoformate, 15 mg. of p-toluenesulfonic acid and 10 ml. of dioxane is stirred for 150 minutes at 25° C. in the presence of anhydrous calcium sulfate. At the end of this time, the mixture is poured into aqueous potassium bicarbonate solution and extracted with ether. These ethereal extracts are dried over sodium sulfate and evaporated to dryness in the presence of a trace of pyridine. The residue is dissolved in 4:1 hexane:benzene and filtered through alumina. Upon evaporation of the filtrate there is thus obtained 3-ethoxy-18-methyl-19-nor-14β,17α-pregna-3,5-dien-20-one which may be further purified through recrystallization through methanol containing a trace of pyridine.

A solution of 1 g. of 3-ethoxy-18-methyl-19-nor-14β,17α-pregna-3,5-dien-20-one in 10 ml. of tetrahydrofuran is added to 30 ml. of 1 N potassium t-butoxide in t-butanol. This solution is shaken under oxygen at 0° C. until the uptake of oxygen ceases. The pH of the solution is then adjusted to 7 by the addition of 1 N of acetic acid and the neutralized mixture is then extracted with ethyl acetate. These extracts are washed with water, dried under sodium sulfate and evaporated to dryness at 30° C. to yield 3-ethoxy-17β-hydroperoxy-18-methyl-19-nor-14β,17α-pregna-3,5-dien-20-one which may be further purified through recrystallization from acetone:water.

A mixture of 3.1 g. of 3-ethoxy-17β-hydroperoxy-18-methyl-19-nor-14β,17α-pregna-3,5-dien-20-one and 1 ml. of acetic acid is stirred at 25° C. with 6 g. of zinc dust for 12 hours. The mixture is then filtered, the residue being washed well with ether, and the filtrate is diluted with ether, washed with water and saturated aqueous sodium bicarbonate solution, dried under sodium sulfate and evaporated to dryness. Chromatography of the residue on silica gel with 9:1 chloroform:methanol yields 17β-hydroxy-18-methyl-19-nor-14β,17α-pregn - 4 - ene-3,20-dione which is further purified through recrystallization from acetone:hexane.

17β-hydroxy-19-nor-14β,17α - pregn - 4 - ene-3,20-dione is obtained in a similar fashion from the corresponding 17β-desoxy compound.

EXAMPLE 4

To a solution of 5 g. of a 17β-hydroxy-18-methyl-19-nor-14β,17α-pregn-4-ene-3,20-dione in 100 ml. of anhydrous benzene are added 1 g. of p-toluenesulfonic acid and 10 ml. of hexanoic anhydride. The mixture is allowed to stand for 24 hours at room temperature and poured with stirring into ice and water. The organic phase is separated, washed and evaporated to yield 17β-hexanoyloxy-18-methyl-19-nor-14β,17α - pregn - 4 - ene-3,20-dione which is further purified through recrystallization from ether:hexane.

By utilizing other anhydrides in the foregoing procedure, the corresponding 17β-acyloxy derivatives are obtained. Thus through the use of pentoic anhydride there is obtained 17β-pentanoyloxy-18-methyl-19-nor-14β,17α-pregn-4-ene-3,20-dione.

EXAMPLE 5

A mixture of 1 g. of 17β-hydroxy-18-methyl-19-nor-14β,17α-pregn-4-ene-3,20-dione 1 g. of p-toluenesulfonic acid monohydrate, 40 ml. of acetic acid and 25 ml. of acetic anhydride is allowed to stand at room temperature for 24 hours, and then poured into water and stirred. This mixture is then extracted with methylene chloride and these extracts are dried and evaporated to yield 17β-acetoxy-18 - methyl - 19 - nor-14β,17α-pregn-4-ene-3,20-dione which is recrystallized from acetone:ether.

17β-acetoxy-19-nor - 14β,17α - pregn-4-ene-3,20-dione is obtatined in an analogous fashion from the corresponding 17β-hydroxy compound.

EXAMPLE 6

To a suspension of 1 g. of 17β-acetoxy-18-methyl-19-nor-14β,17α-pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17β-acetoxy-18-methyl-19-nor-14β,17α-pregna-3,5-dien-20-one which is recrystallized from acetone:hexane.

A mixture of 5 g. of 3-ethoxy-17β-acetoxy-18-methyl-19-nor-14β,17α-pregna-3,5-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-17β-acetoxy-18-methyl-19-nor-14β,17α-pregn-4-ene-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture is collected by filtration, washed with water and dried to yield 6α-chloro-17β-acetoxy-18-methyl-19-nor-14β,17α-pregn-4-ene-3,20-dione, which is recrystallized from acetone:hexane.

In a similar fashion, 6α-chloro-17β-acetoxy-19-nor-14β,17α-pregn-4-ene-3,20-dione is obtained according to this procedure.

EXAMPLE 7

A stream of perchloryl fluoride is passed through a solution of 1 g. of 3-ethoxy-17β-acetoxy-18-methyl-19-nor-14β,17α-pregna-3,5-dien-20-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed water and dried to yield 6α-fluoro-17β-acetoxy-18-methyl-19-nor-14β,17α-pregn-4-en-20-one which is recrystallized from acetone:hexane.

EXAMPLE 8

To a suspension of 1 g. of 6α-chloro-17β-acetoxy-18-methyl-19-nor-14β,17α-pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-6-chloro-17β-acetoxy-18-methyl-19-nor-14β,17α-pregna-3,5-dien-20-one which is recrystallized from acetone:hexane.

To a solution of 1 g. of 3-ethoxy-6-chloro-17β-acetoxy-18-methyl-19-nor-14β,17α-pregna-3,5-dien-20-one in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-chloro-17β-acetoxy-18-methyl-19-nor-14β,17α-pregna-4,6-diene-3,20-dione.

In a similar fashion 6-chloro-17β-acetoxy-19-nor-14β,17α-pregna-4,6-diene-3,20-dione is obtained according to the procedure of this example.

EXAMPLE 9

A solution of 1 g. of sodium borohydride in 3 ml. of water is added to an ice-cooled solution of 1 g. of 17β-acetoxy-18-methyl-19-nor-14β,17α-pregn-4-ene-3,20-dione in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3β-hydroxy-17β-acetoxy-18-methyl-19-nor-14β,17α-pregn-4-en-20-one which may be further purified by recrystallized from acetone:hexane.

3β-Hydroxy-17β-acetoxy-19-nor-14β,17α-pregn-4-en-20-one is similarly obtained according to the foregoing procedure.

EXAMPLE 10

A mixture of 1 g. of 3β-hydroxy-17β-acetoxy-18-methyl-19-nor-14β,17α-pregn-4-en-20-one 4 ml. of pyridine and 2 ml. of acetic anhydride is allowed to stand at room temperature for 15 hours. The mixture is then poured into ice water and the solid which forms is collected by filtration, washed with water and dried to yield 3β,17β-diacetoxy-18-methyl-19-nor-14β,17α-pregn-4-en-20-one which may be further purified through recrystallization from acetone:hexane.

3β,17β-Diacetoxy-19-nor-14β,17α-pregn-4-en-20-one is similarly obtained according to the foregoing procedure.

EXAMPLE 11

Two milliliters of dihydropyran are added to a solution of 1 g. of 3β-hydroxy-17β-acetoxy-19-nor-14β,17α-pregn-4-en-20-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3β-tetrahydropyranyloxy-17β-acetoxy-19-nor-14β,17α-pregn-4-en-20-one which is recrystallized from pentane.

3β-Tetrahydropyranyloxy-17β-acetoxy-18-methyl-19-nor-14β,17α-pregn-4-en-20-one is obtained via the foregoing procedure.

What is claimed is:
1. Compounds of the formula

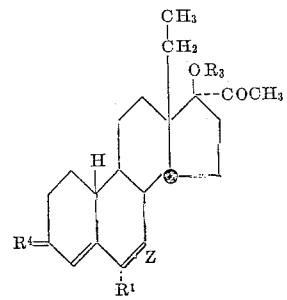

wherein Z is a carbon-carbon double bond or a carbon-carbon single bond;
$R^1$ is hydrogen, chloro or fluoro;
$R^3$ is hydrogen or a hydrocarbon carboxylic acyl group of less than 12 carbon atoms; and
$R^4$ is an oxygen atom or the group

in which $R^5$ is hydrogen, tetrahydropyranyl or a hydrocarbon carboxylic acyl group of less than 12 carbon atoms.
2. Compounds according to claim 1 wherein $R^4$ is an oxygen atom and $R^1$, $R^3$, and Z are as therein described.
3. The 19-nor-14β,17α-pregnene according to claim 2 wherein
$R^1$ is hydrogen;
$R^3$ is hydrogen; and
Z is a carbon-carbon single bond.
4. 19-Nor-14β-17α-pregnenes according to claim 2 wherein
$R^1$ is hydrogen;
$R^3$ is a hydrocarbon carboxylic acyl group of less than 12 carbon atoms; and
Z is a carbon-carbon double bond.
5. The 14β,17α-pregnene according to claim 4 wherein $R^3$ is acetyl.
6. The 19-nor-14β,17α-pregnene according to claim 2 wherein
$R^1$ is chloro;
$R^3$ is acetyl; and
Z is a carbon-carbon double bond.

References Cited

UNITED STATES PATENTS 3,062,845  11/1962  Mills et al. _____ 260—397.4
3,056,809  10/1962  Barton et al. _____ 260—397.4

FOREIGN PATENTS 876,902  9/1961  Great Britain.
1,337,807  8/1963  France.

OTHER REFERENCES

Ehrenstein et al., Endocrinology, 60, 681 and 682 (1957).
Johnson et al., J. Amer. Chem. Soc. 79: 2005–2009 (1957), pp. 2005 and 2006 relied on.

LEWIS GOTTS, Primary Examiner.
ELBERT L. ROBERTS, Examiner.
T. M. MESHBESHER, Assistant Examiner.